(12) United States Patent
Kammoun et al.

(10) Patent No.: US 12,373,601 B2
(45) Date of Patent: Jul. 29, 2025

(54) TEST ENVIRONMENT PRIVACY MANAGEMENT SYSTEM

(71) Applicant: SAP SE, Walldorf (DE)

(72) Inventors: Khaled Kammoun, Dielheim (DE); Rolf Eiling, Heidelberg (DE); Mohammad Nabeel Siddiqui, Atlanta, GA (US); Saurabh Suman Choudhuri, Cumming, GA (US)

(73) Assignee: SAP SE, Walldorf (DE)

( * ) Notice: Subject to any disclaimer, the term of this patent is extended or adjusted under 35 U.S.C. 154(b) by 189 days.

(21) Appl. No.: 18/382,193

(22) Filed: Oct. 20, 2023

(65) Prior Publication Data

US 2025/0131125 A1    Apr. 24, 2025

(51) Int. Cl.
*G06F 21/62* (2013.01)

(52) U.S. Cl.
CPC ........ *G06F 21/6254* (2013.01); *G06F 21/629* (2013.01)

(58) Field of Classification Search
CPC . G06F 21/6254; G06F 21/629; G06F 21/6245
See application file for complete search history.

(56) References Cited

U.S. PATENT DOCUMENTS

| 2013/0167192 A1* | 6/2013 | Hickman | G06F 21/6245 726/1 |
| 2018/0253562 A1* | 9/2018 | Antonatos | G06F 21/6218 |

\* cited by examiner

*Primary Examiner* — Izunna Okeke
(74) *Attorney, Agent, or Firm* — SCHWEGMAN LUNDBERG & WOESSNER, P.A.

(57) ABSTRACT

Systems and methods are provided for generating a combined list of attributes for at least one selected object by combining known attributes and a list of attributes for custom tables, determining a scrambling method for each attribute in the combined list of attributes for the at least one selected object, and scrambling each attribute of the combined list of attributes for the at least one selected object, according to the scrambling method for each attribute. The systems and methods further provided for generating a compliance report indicating what was changed in a system by the scrambling of each attribute and what scrambling methods were applied and allowing release of production data comprising the scrambled attributes for the at least one selected object, to a test system for use in testing functionality for an application or service.

18 Claims, 12 Drawing Sheets

Create New Project

① Project Definition ──── ② System Landscape ──── ③ Business Objects

1. Project Definition

Name:* [New Project]
Type: [Discovery ▸]
Description: [Discovery]
              [Scrambling]

☐ Enable Text Analysis

[Previous] [Finish] [Cancel]

Create New Project 500

① Project Definition —— ② System Landscape —— ③ Business Objects

3. Business Objects

Please select one or multiple Business Objects

☑ Personal Data
   Employees / User Master / Customers / Vendors
☑ Address
   Any Address Data
☐ Organizational Data
   Organization / Company Previous [Finish] Cancel

FIG. 5

| Data Dictionary Scan | |
|---|---|
| Field Name | Type |
| ZP0002 - ANRED | Title |
| ZP0002 - VORS2 | Title |
| ZP002 - NAMZU | Title |
| ZP0002 - NAMZ2 | Title |
| ZP0002 - VORSW | Title |
| ZP0002 - TITL2 | Title |
| ZP0002 - TITEL | Title |
| ZTRACEAUFK - USER1 | Telephone |

FIG. 6 (Continued)

Scrambling — 902, 904, 906, 908

| Table Name | Field Name | Count | Scrambling Method |
|---|---|---|---|
| /FLDQ/DC_NAM_STC | TITLE | 0 | Shuffle |
| T76MGE_ADM | ANRDE | 0 | Shuffle |
| T7PLD1 | NMF21 | 0 | Delete |
| BUT_ADRP_ACT | TITLE | 0 | Shuffle |
| INVGCSMOBJORG_D | FAXNUMBEREXTENSION | 0 | Delete |
| /FLDQ/DC_NAM_ID2 | TITLE_ACA2 | 0 | Shuffle |
| CTRITMADRS_D | NAME4 | 0 | Delete |
| BUTADRSEARCH | PHONSTRING | 0 | Delete |
| BUT_ADRP_PRC | NAME_LAST | 0 | Delete |
| RBKP | NAME3 | 0 | Delete |

FIG. 9

TEST ENVIRONMENT PRIVACY MANAGEMENT SYSTEM

BACKGROUND

In a typical system, an entity has a test environment and a production environment. The test environment is used to test an application or service functionality before it is released to users. The application or service is deployed to the production environment to be made available to users. It is important that the test environment closely resemble the production environment to ensure the functionality of the application or service is free of any issues before moving into production.

BRIEF DESCRIPTION OF THE DRAWINGS

Various ones of the appended drawings merely illustrate example embodiments of the present disclosure and should not be considered as limiting its scope.

FIGS. 3-6 each illustrate an example user interface, according to some example embodiments.

FIGS. 8-9 each illustrate an example user interface, according to some example embodiments.

DETAILED DESCRIPTION

Figure 1:
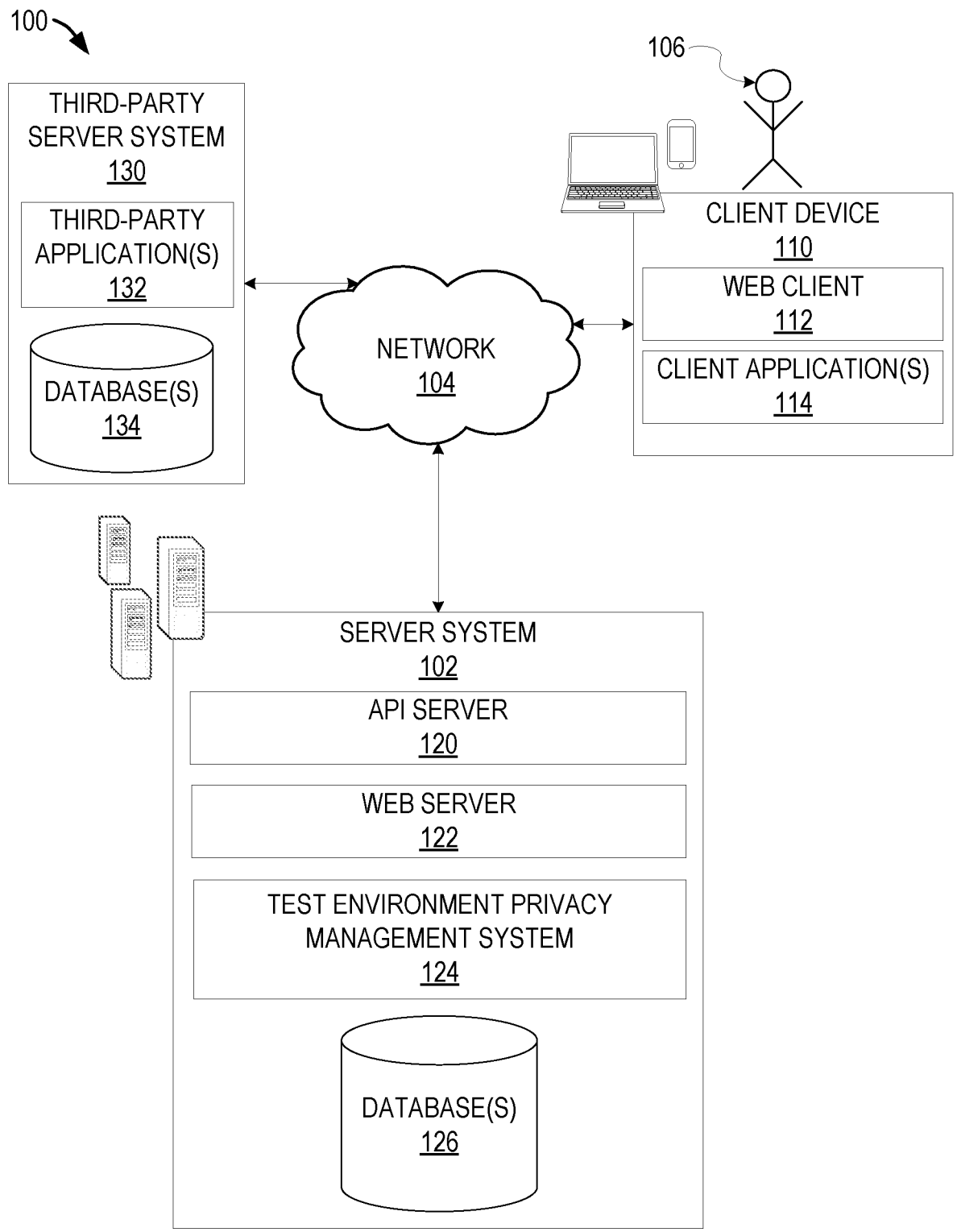
FIG. 1 is a block diagram illustrating a networked system, according to some example embodiments.

Systems and methods described herein relate to a test environment privacy management system. As mentioned above, to ensure the functionality of the application or service is free of any issues before moving into production, it is important that the test environment closely resemble the production environment. To do this, actual data from the production system is used to test the functionality of the application or service. The data from the production system can include personal user data, entity confidential data (e.g., banking data, vendor data, intellectual property data), and other data that should remain private or confidential. Thus, it is important that the test system maintain privacy of any confidential or user personal data from the production system.

Personal data includes any data that is considered personal, whether it is personal data of a user, employee, customer, supplier, or other person or entity. Some examples of personal data include system identifier, last name, first name, title, date of birth, sex, telephone, URL, email, tax number, IBAN, credit card, employee number, address (e.g., street name, post code, city, country, house number), company name, company telephone, company URL, company VAT number, and the like.

The problem, however, is that a given entity does not know where all confidential and private data resides due to the very large volume of data as well as the complexity of the data structures. For example, it is not possible for an entity to find all confidential and private data when an average enterprise stores over billions of files or hundreds of terabytes of data. Further, the data is typically structured such that not all data is visible to a user in the entity. For instance, data is often redundantly stored several times for performance, making for complex data structures. For example, data is indexed for faster performance which would not be known by an entity just looking at the functions of the system or there may be old data structures that were never deleted and thus still exist in the system unknown to an entity. There is no way to find or determine these complex data structures or old data structures manually. In addition, if an entity cannot use particular data due to privacy or confidential issues, it will significantly limit the ability to test a service or application.

An entity's inability to secure private or confidential data can lead to reputational damage, loss of customer trust, and legal ramifications. Further, the entity could face compliance violations, such as violations of the General Data Protection Regulation (GDPR) and other privacy regulations. Non-compliance with GDRP, for example, can result in fines of up to 20 million Euros or 4% of a company's annual global turnover, whichever is higher.

Embodiments described herein provide for securing production data to be used in a test environment by scanning a system for private or confidential data to generate list of attributes for at least one selected object by combining known attributes of standard tables and a list of attributes determined for custom tables. Embodiments further determine a scrambling method for each attribute in the list of attributes for the at least one selected object and scramble each attribute of the list of attributes for the at least one selected object, according to the scrambling method for each attribute. The embodiments further generate a compliance report indicating what was changed in a system by the scrambling of each attribute and what scrambling methods were applied and allow release of production data comprising the list of scrambled attributes for the at least one selected object, to a test system for use in testing functionality for an application or service.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, wearable computing device, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, utilize a backend processing system 124, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party server system 130, server system 102) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an application for pushing a commit to update code in a project, an application for accessing and utilizing a test environment privacy management system 124, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access machine learning models, to authenticate a user 106, to verify a method of payment, access a test environment privacy management system 124, and so forth), and so forth. Conversely, one or more client applications 114 may not be included in the client device 110, and then the client device 110 may use its web browser to access the one or more applications hosted on other entities in the system 100 (e.g., third-party server system 130, server system 102).

A server system 102 may provide server-side functionality via the network 104 (e.g., the Internet or wide area network (WAN)) to one or more third-party server system 130 and/or one or more client devices 110. The server system 102 may include an application program interface (API) server 120, a web server 122, and test environment privacy management system 124 that may be communicatively coupled with one or more databases 126.

The one or more databases 126 may be storage devices that store data related to users of the system 100, applications associated with the system 100, cloud services, machine learning models, data related to entities/products/services, and so forth. The one or more databases 126 may further store information related to third-party server system 130, third-party applications 132, third-party database(s) 134, client devices 110, client applications 114, users 106, and so forth. In one example, the one or more databases 126 is cloud-based storage.

The server system 102 may be a cloud computing environment, according to some example embodiments. The server system 102, and any servers associated with the server system 102, may be associated with a cloud-based application, in one example embodiment.

The test environment privacy management system 124 provides back-end support for third-party applications 132 and client applications 114, which may include cloud-based applications. The test environment privacy management system 124 provides for discovery of personal and confidential data, scrambling of such data, data slicing, and data scaling, among other functions as described in further detail below. The test environment privacy management system 124 can comprise one or more servers or other computing devices or systems.

The system 100 further includes one or more third-party server system 130. The one or more third-party server system 130 may include one or more third-party application(s). The one or more third-party application(s) 132, executing on third-party server(s) 130, may interact with the server system 102 via API server 120 via a programmatic interface provided by the API server 120. For example, one or more of the third-party applications 132 may request and utilize information from the server system 102 via the API server 120 to support one or more features or functions on a website hosted by the third party or an application hosted by the third party.

The third-party website or application 132, for example, may provide access to functionality and data supported by third-party server system 130. In one example embodiment, the third-party website or application 132 may provide access to functionality that is supported by relevant functionality and data in the third-party server system 130. In another example, a third-party server system 130 is a system associated with an entity that accesses cloud services via server system 102.

The third-party database(s) 134 may be storage devices that store data related to users of the third-party server system 130, applications associated with the third-party server system 130, cloud services, machine learning models, parameters, and so forth. The one or more databases 126 may further store information related to third-party applications 132, client devices 110, client applications 114, users 106, and so forth. In one example, the one or more databases 134 are cloud-based storage.

Figure 2:
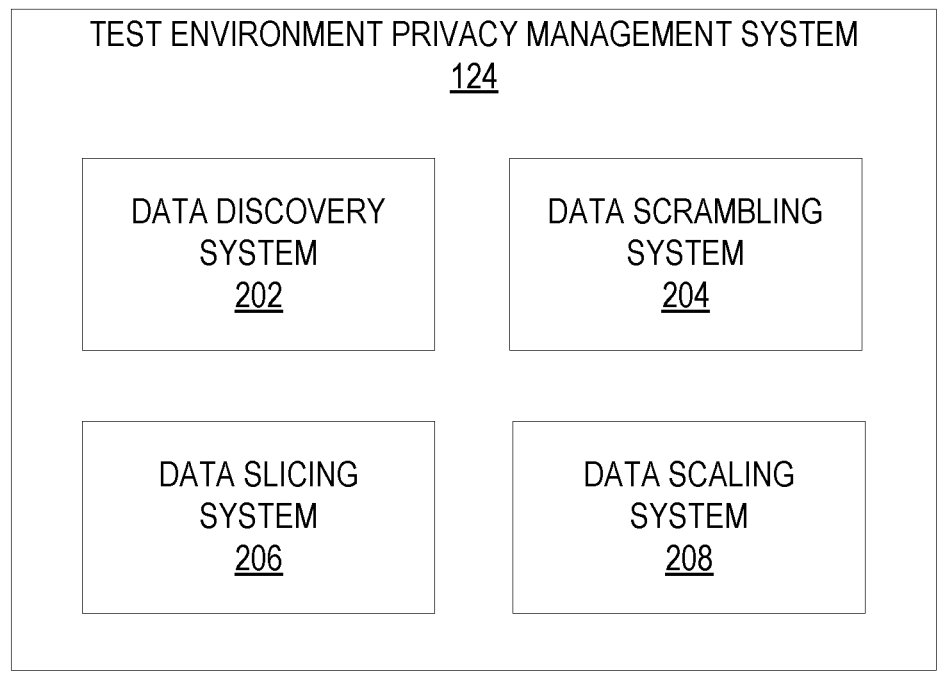
FIG. 2 is a block diagram illustrating a test environment privacy management system, according to some example embodiments.

FIG. 2 is a block diagram 200 showing further detail of the test environment privacy management system 124. The test environment privacy management system 124 comprises one or more components or systems, such as systems 202-208. It is to be understood that more or less components or systems can be utilized by the test environment privacy management system 124, and that some components or systems could be combined into single a single component or system, in example embodiments.

The data discovery system 202 provides for full system profiling and business object based profiling to determine data in a system that is associated with personal or confidential information. The business object profiling can comprise generic, line of business, industry, solution, and other profiles.

The data scrambling system 204 provides for various method to scramble personal or confidential information in production data. In one example, predefined templates are provided for data scrambling levels, such as a low level, medium level and high level. These scrambling methods can be performed on both master data and transactional data. Examples of scrambling methods that can be used include keep partial data, delete, jumble value, hash value, generate new first name, generate new last name, generate new date of birth, generate new street, generate new company name, generate new IBAN, generate new telephone number, generate new post code, generate new city, generate new number, generate new sequential number, dummy value, shuffle, and the like.

The data scrambling system 204 further ensures that an end-to-end process flow in the scrambled environment is working consistently post scrambling (e.g., to be sure no functionality is broken due to scrambled data). For example, the data scrambling system 204 evaluates metadata of a system to locate all table fields to scramble synchronized. Additionally, the data scrambling system 204 uses system scans to locate any table field relevant in custom tables (e.g., customer owned/created tables). In some examples, a centralized mapping is used to ensure that the same data is scrambled to the same value wherever it is found.

The data slicing system 206 provides for reducing data size for testing based on historical time, such as a date or date range, based on legal entity, such as a company code, or by other means. In some examples a combination of parameters (e.g., date, legal entity) can be used to reduce the data size for testing.

The data scaling system 208 provides for expanding data size for testing based on already existing date. This can be done for generic, line of business, industry and solution specific use cases. Data scaling can also be done for different business objects, such as master and transactional data, as well as for a specific legal entity such as a company code. In some examples a combination of parameters (e.g., business object, specific legal entity, other) can be used to expand the data size for testing.

The test environment privacy management system 124 can provide a user interface and cause the user interface to be presented on a client device 110 so that a user can access the system to choose the different components 202-208 (or other components of the system) to use. In one example, the computing system (e.g., the server system 102 or test environment privacy management system 124) causes display of a user interface on a client device 110 so that a user can select various options for determining what type of data is in the production data, scrambling data in production data, slicing or scaling data in production data, and so forth. For example, a user can use a client device 110 to access the test environment privacy management system 124 (e.g., directly, via API server 120, via a client application 114, etc.). FIG. 3 shows an example user interface 300 that can be displayed on a client device 110 that allows a user to start a new project by selecting a project definition. Some examples of project definitions include discovery, scrambling, slicing and scaling, as mentioned above with respect to FIG. 2. The user may start by selecting "Discovery" as the project type to determine what type of data is included in production data. In some examples, the data discovery is run initially to determine what data is in the production data and to determine what personal or confidential data should be scrambled.

Figure 4:
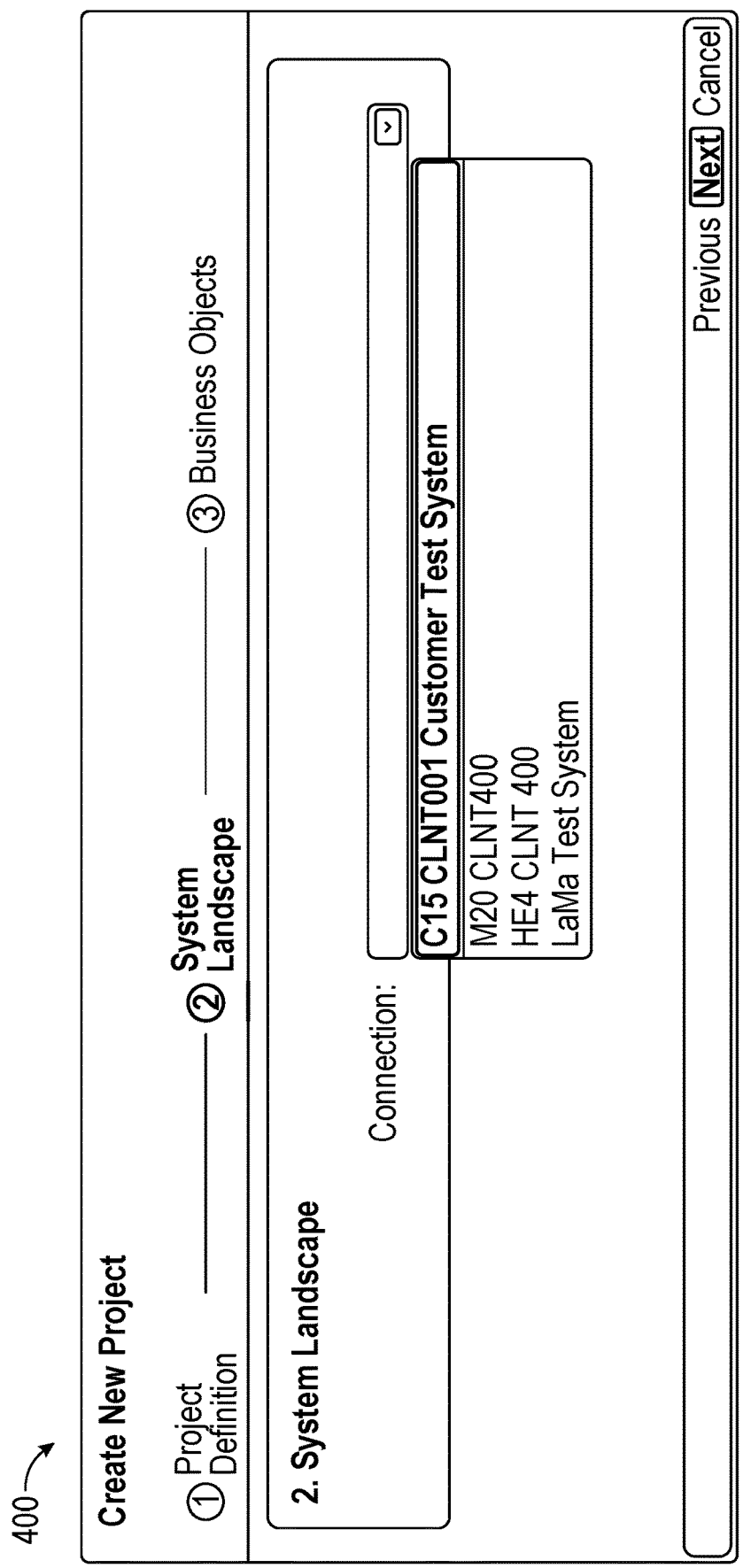

After selecting "Discovery" the computing system can cause display of the example user interface 400 shown in FIG. 4 to allow a user to select a particular system to execute the data discovery. A user may run this discovery process to determine what personal and confidential data resides in a particular system before determining what should be scrambled.

Once a particular system is selected, the computing system can cause display of the example user interface 500 shown in FIG. 5 to allow the user to select one or more objects that are each associated with a type of personal or confidential data in production data. The example objects in FIG. 5 include personal data, address, and organizational data. Other example objects can include banking data and intellectual property data. It is to be understood that more objects, less objects, or different objects can be available for selection in embodiments described herein. Once the user selected one or more objects and selects "finish" the computing system connects to the target system, which was selected in the user interface 400 in FIG. 4 and scans the target system to provide some statistics on the data in the target system. For example, the computing system executes one or more predefined scripts, such as SQL queries, to scan the system. In some examples, there are one or more predefined scripts associated with each object. The computing system executes the predefined scripts associated with one or more objects selected by the user to find personal and confidential data associated with each object.

Figure 6:
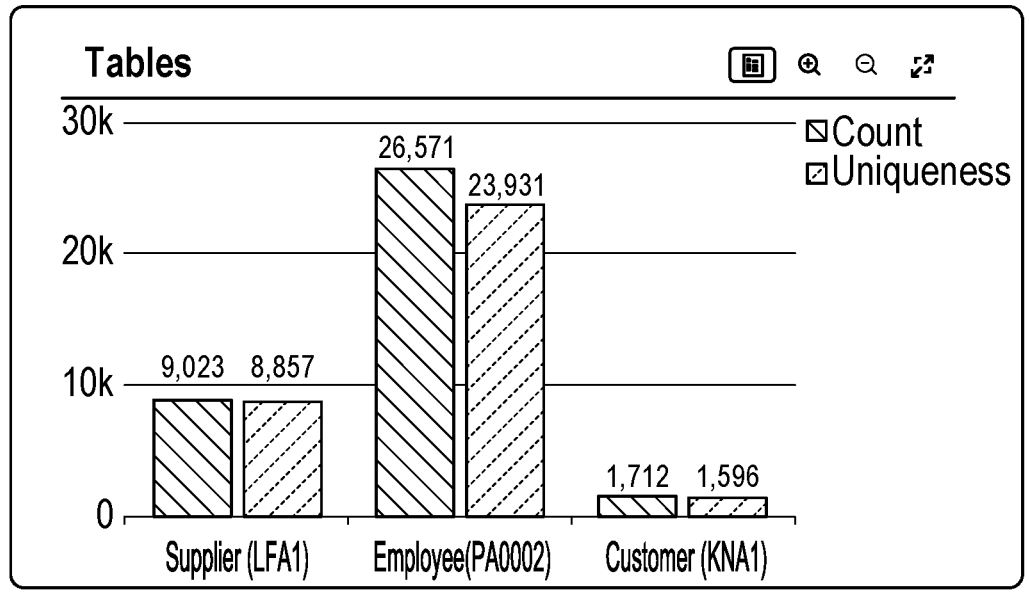
Figure 6:
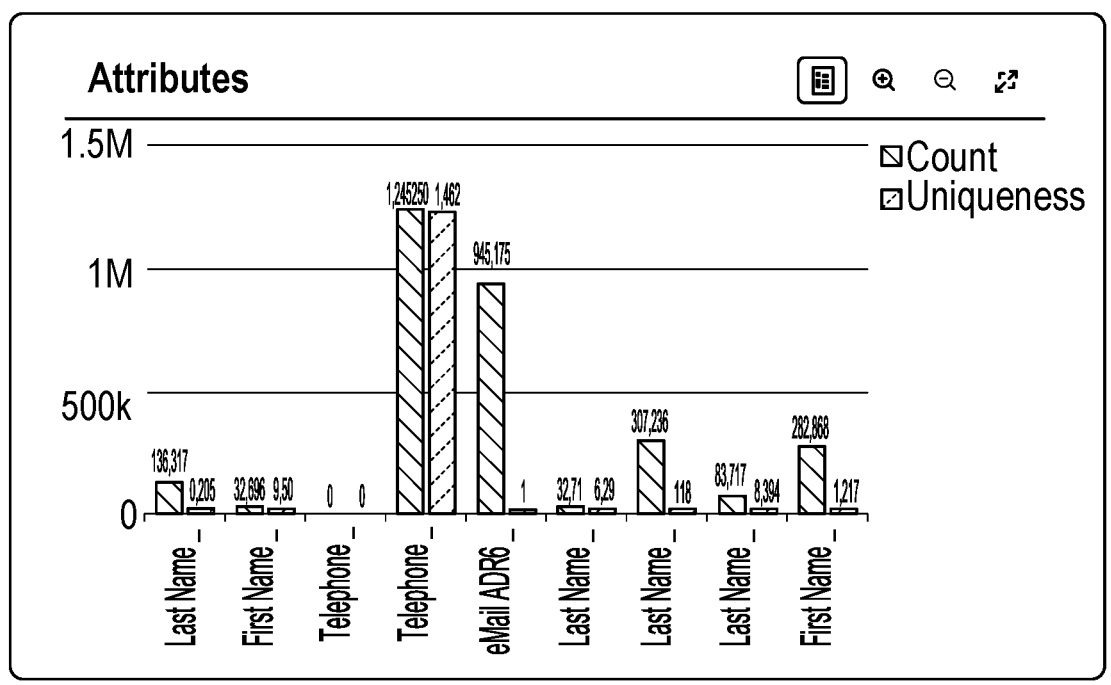

In some examples, the computing system displays various statistics related to the scan of the system determined by the executed predefined scripts. FIG. 6 illustrates some example statistics that can be displayed in a user interface 600. In the example shown in FIG. 6, statistics on tables, attributes and a data dictionary scan are provided in the example user interface 600 when a tab the object Personal Data 602 is selected. When a tab is selected for each object, such as the tab for Address 604 and Operational Data 606, different statistics related to that object will be displays for tables, attributes and a data dictionary will be presented in the user interface.

In one example, the data dictionary comprises custom fields that are specified or created by a specific entity. This is distinguished from standard fields that are provided for all entities. These custom fields are identified based on a type of the field (e.g., last name, first name, etc.) and/or a text scan of data in each field to determine if the custom field is relevant to the particular object. For example, for a Personal Data object, the data type may include a last name, first name, telephone number, address, and so forth that are included in any personal data. Based on the data type, the computing system can determine that the custom field is relevant to the particular object. In some cases an entity may not be diligent about selecting a correct or accurate type for a custom field, and thus, the computing system can also scan the text of the data for each field to determine whether or not the custom field is relevant to a particular object. This is important to be sure no personal or confidential data is missed. Further, in this way an entity does not need to know how data is stored among the vast amount of data in the system, which would not be possible to know in a manual fashion.

To scramble production data, a user can select a project type for "scrambling" data, as shown in the example user interface 300 of FIG. 3. In one example, the computing device provides predefined templates comprising a low, medium and high level of scrambling that can be selected by the user. The computing system assigns a particular scrambling method to each attribute to be scrambled, based on the selected level of scrambling. For example, an entity may be handing the data over to an external system for testing, and thus, may wish to scramble the data at the highest level. On the other hand, an entity may be using the data to test internally and need to have some attributes intact, and thus, may choose a low or medium level of scrambling. As described above the user can again select a system, as shown in FIG. 4 and one or more objects, as shown in FIG. 5 and discussed above.

Figure 7:
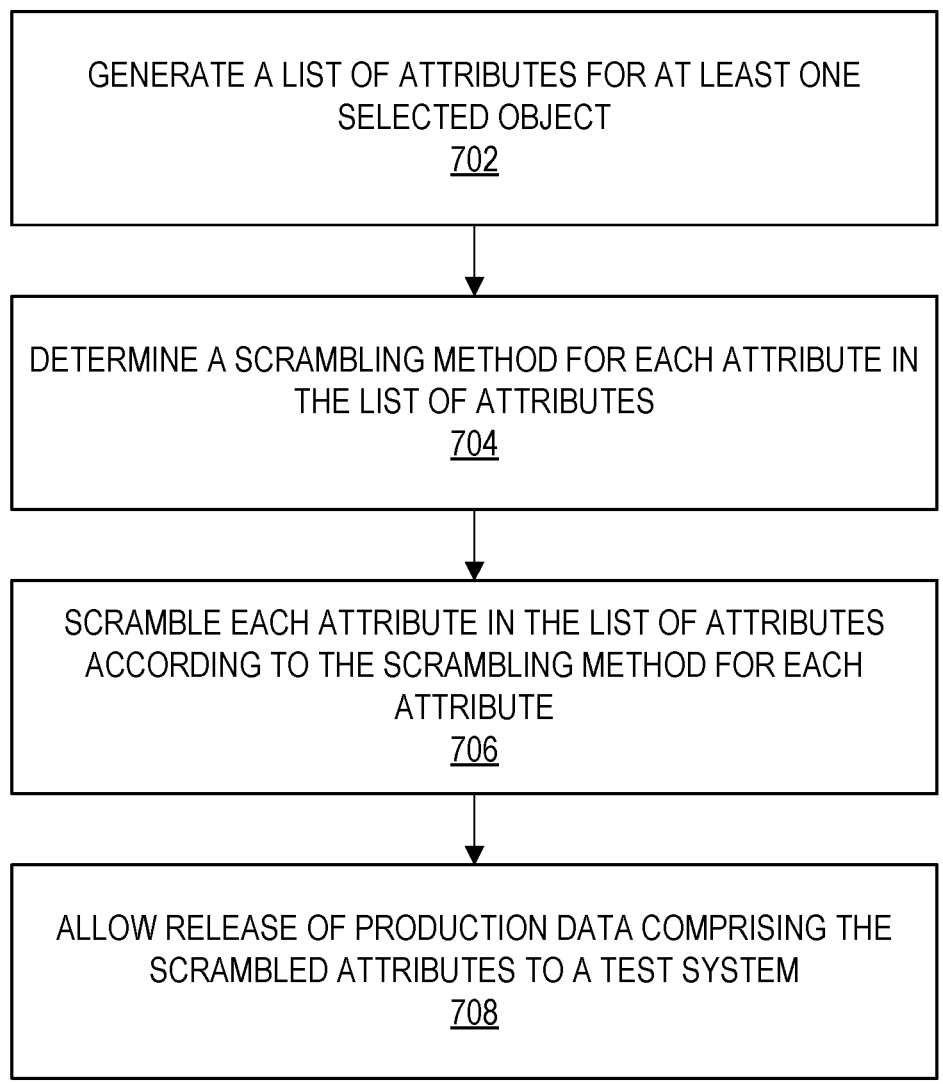
FIG. 7 comprises a flow chart illustrating aspects of a method, according to some example embodiments.

FIG. 7 is a flow chart illustrating aspects of a method 700, for determining attributes associated with personal and/or confidential data and scrambling such data, according to some example embodiments. For illustrative purposes, method 700 is described with respect to the block diagram of FIG. 1 and FIG. 2. It is to be understood that method 700 may be practiced with other system configurations in other embodiments.

In operation 702, a computing system, such as the server system 102 or test environment privacy management system 124, generates a list of attributes for at least one selected object. As described above, the computing system can cause a user interface to display on a client device 110 that allows a user to select to scramble data and then select a target system and one or more objects that each are associated with a type of personal or confidential data in production data on the selected system. Once the user selects the target system and at least one object, the computing system causes for display, a list of attributes for each selected object.

To generate the list of attributes for the at least one selected object, the computing device determines known attributes of tables associated with the at least one selected object. Each selected object is associated with a type of personal or confidential data in production data. In one example, the tables are standard tables that are available for all entities, and thus, the attributes for these tables are known by the computing system. For example, the computing system determines which known attributes of standard tables are associated with the type of personal or confidential data in production data, and selects those known attributes to be included in a list of attributes for the at least one selected object.

The computing system can also determine custom tables associated with the at least one selected object and determine a list of attributes for the custom tables. Custom tables are tables that are defined by a particular entity, and thus, the attributes of the customer tables are not known by the computing system. The computing system determines the list of attributes for the custom tables based on data types for each custom table and/or a text analysis of data in each custom table, as explained above. For example, the computing system does a detailed examination of the system's metadata, as explained above, as well as uses advanced features of database engines to benefit from the latest advancements in machine learning. In some examples, each table field of a certain minimum length will undergo text analysis to check if it might contain a type of object relevant for scrambling, such as a name or telephone number. In some examples, any findings are listed and presented to a user for a final decision. The computing system can then generate a combined list of attributes for the at least one selected object by combining the known attributes of standard tables and the list of attributes for the custom tables.

In some examples, determining known attributes and determining a list of custom attributes comprises running predefined scripts associated with the at least one selected object to locate data associated with a type of data for the at least one object, as explained above.

In operation 704, the computing system determines a scrambling method for each attribute in the combined list of attributes for the at least one selected object. In one example, determining a scrambling method for each attribute in the combined list of attributes for the at least one selected object is based on a selected template that sets a scrambling method of each attribute in the combined list of attributes, as explained above. In another example, a user can custom select a scrambling method for each attribute. In yet another example, the scrambling method is automatically selected for each attribute based on the selected template, and then the user can change one or more scrambling method for each of a given attribute.

Figure 8:
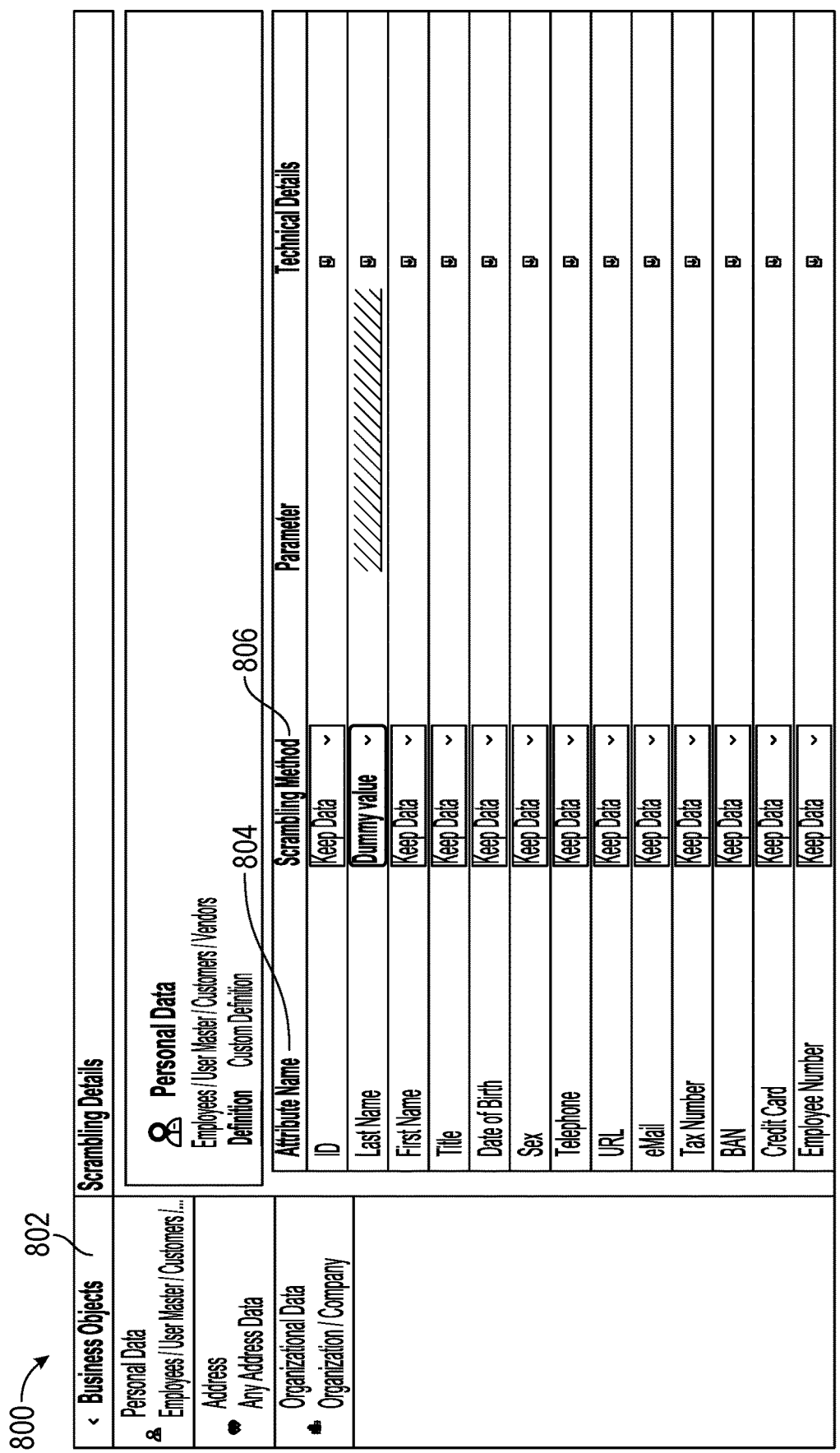

FIG. 8 illustrates an example user interface 800 that includes three selected objects 802 that include Personal Data, Address and Organizational data. A list of attributes is provided for each of these objects. In the example user interface 800, the Personal Data object is selected and a list of attributes 804 for the Personal Data object are listed. Scrambling methods 806 are listed for the attributes. For example, a different scrambling method is listed next to each attribute. In this example, a drop-down box is provided for each attribute for a user to select a type of scrambling method for that attribute, or change a scrambling method for a given attribute. For instance, the computing device receives a change to one or more scrambling method determined based on selected template and updates one or more attributes associated with eth one or more scrambling method, based on the received change to the one or more scrambling methods.

In operation 706, the computing system scrambles each attribute in the combined list of attributes for the at least one selected object, according to the scrambling method for each attribute, to generate scrambled attributes.

In some examples, the computing system generates a compliance report indicating what was changed in a system by the scrambling of each attribute and what scrambling methods were applied. FIG. 9 illustrates an excerpt from an example report 900. The example report 900 includes a table name 902 that was scrambled, a field name 904 that was scrambled, a count 906 of number of rows that were scrambled, and a scrambling method 908 name which was used.

In operation 708, the computing system allows release of the production data comprising the scrambled attributes for the at least one selected object, to test a system for use in testing functionality for an application or service.

In some examples, an entity will want to do cross-landscape testing across different systems and thus, it is important to keep how attributes are scrambled in sync across more than one system. In this case, the computing system generates and maintains a mapping for attributes so that the same scrambling can be used across systems for the same attributes, even if the attributes have different naming conventions across systems. For example, the computing device generates a second list of attributes for a second selected object in a second system by combining known attributes of the standard tables and a list of attributes for custom tables in production data for the second system and determines a scrambling method for each attribute in the list of attributes for the second selected object, as explained above. The computing system scrambles each attribute of the list of attributes for the second selected object, according to the scrambling method for each attribute and a mapping of attributes between the first system and the second system. The computing system allows release of production data comprising the list of scrambled attributes for the second selected object, to a test system for use in testing functionality for the application or service, as also explained above.

In some examples, an entity may wish to first reduce the amount of data (e.g., to the last two years) for testing, and thus, for scrambling. In one example, the computing device causes display of a user interface for a user to select parameters to use to reduce the total production data. Some examples of parameters include a date (e.g., a year), a date range, an organizational unit, or other means for specify a scope for the data. The computing system receives one or more parameters selected or specified in the user interface and determines candidate data to remove based on the selected or specified parameters. For example, if a parameter is a date range, such as the last two year, the computing system determines that the candidate data to remove from the production data is data that is older than the last two years. In some cases, if the computing system simply excludes the data that is older than the last two years, some functionality may be broken or some data in the data to be used for testing may be inaccurate. Once example is whether there is an open item, such as a posting that has not been confirmed yet (e.g., an amount still due for payment by a customer), in the candidate data. Once the computing system determines open items in the candidate data, it reduces the total production data by removing candidate data except for open items in the candidate data, to generate a reduced set of total production date. The reduced set is what will be used for testing, and thus, what will be analyzed for scrambling, as explained above.

In one example, determining candidate data to remove from the production data is further based on table size. In some examples, only tables over a predetermined size are considered for candidate data to use computing resources more efficiently. For example, typically a significant portion of the data is in a set of large tables, and there are also many very small tables with the rest of the data, it would take a lot of time and computing resources to exclude each very small table for little gain, versus just focusing on tables over a predetermined size. During the discovery process described above, in some examples, the statistics include details on table sizes that can also inform for reducing the data. For example, the statistics can include the top 20 largest tables (by name and size), the top 20 largest tables record count (with name and record count for each), the top 20 largest custom tables, the top 20 largest custom tables record count, the overall system size and difference between customer versus standard tables, and the like.

In view of the above disclosure, various examples are set forth below. It should be noted that one or more features of an example, taken in isolation or combination, should be considered within the disclosure of this application.

Example 1. A method comprising:
    determining, by a computing system, known attributes of tables associated with at least one selected object associated with a type of personal or confidential data in production data;
    determining, by the computing system, custom tables associated with the at least one selected object;
    determining, by the computing system, a list of attributes for the custom tables based on data types for each custom table and a text analysis of data in each custom table;
    generating, by the computing system, a combined list of attributes for the at least one selected object by combining the known attributes and the list of attributes for the custom tables;
    determining, by the computing system, a scrambling method for each attribute in the combined list of attributes for the at least one selected object;
    scrambling, by the computing system, each attribute of the combined list of attributes for the at least one selected object, according to the scrambling method for each attribute, to generate scrambled attributes;
    generating, by the computing system, a compliance report indicating what was changed in a system by the scrambling of each attribute and what scrambling methods were applied; and
    allowing release of production data comprising the scrambled attributes for the at least one selected object, to a test system for use in testing functionality for an application or service.

Example 2. A method according to any of the previous examples, wherein determining a scrambling method for each attribute in the combined list of attributes for the at least one selected object is based on a selected template that sets a scrambling method of each attribute in the combined list of attributes.

Example 3. A method according to any of the previous examples, wherein the selected template is one that defines a low, medium, or high level of scrambling methods.

Example 4. A method according to any of the previous examples, further comprising:
    receiving a change to one or more scrambling method determined based on the selected template; and
    updating one or more attributes associated with the one or more scrambling method based on the received change to the one or more scrambling method.

Example 5. A method according to any of the previous examples, wherein the production data is a reduced set of total production data, and the reduced set is generating by performing operations comprising:
    receiving selected parameters to reduce the total production data;
    determining candidate data to remove from the production data based on the selected parameters;
    determining open items in the candidate data; and
    reducing the total production data by removing candidate data except for open items in the candidate data, to generate the reduced set of total production data.

Example 6. A method according to any of the previous examples, wherein the selected parameters include at least one of a date and an organizational unit.

Example 7. A method according to any of the previous examples, wherein determining candidate data to remove from the production data is further based on table size, wherein only tables over a predetermine size are considered for candidate data.

Example 8. A method according to any of the previous examples, wherein determining known attributes and determining a list of attributes for the custom tables comprises running predefined scripts associated with the at least one selected object to locate data associated with a type of data for the at least one object.

Example 9. A method according to any of the previous examples, wherein the system is a first system and further comprising:
    generating a second list of attributes for a second selected object in a second system by combining known attributes and a list of attributes for custom tables in production data for the second system;
    determining a scrambling method for each attribute in the list of attributes for the second selected object;
    scrambling each attribute of the list of attributes for the second selected object, according to the scrambling method for each attribute and a mapping of attributes between the first system and the second system, to generate scrambles attributes; and allowing release of production data comprising the scrambled attributes for the second selected object, to a test system for use in testing functionality for the application or service.

Example 10. A computing device comprising:
a memory that stores instructions; and
one or more processors configured by the instructions to perform operations comprising:
determining known attributes of tables associated with at least one selected object associated with a type of personal or confidential data in production data;
determining custom tables associated with the at least one selected object;
determining a list of attributes for the custom tables based on data types for each custom table and a text analysis of data in each custom table;
generating a combined list of attributes for the at least one selected object by combining the known attributes and the list of attributes for the custom tables;
determining a scrambling method for each attribute in the combined list of attributes for the at least one selected object;
scrambling each attribute of the combined list of attributes for the at least one selected object, according to the scrambling method for each attribute, to generate scrambled attributes;
generating a compliance report indicating what was changed in a system by the scrambling of each attribute and what scrambling methods were applied; and
allowing release of production data comprising the scrambled attributes for the at least one selected object, to a test system for use in testing functionality for an application or service.

Example 11. A computing device according to any of the previous examples, wherein determining a scrambling method for each attribute in the combined list of attributes for the at least one selected object is based on a selected template that sets a scrambling method of each attribute in the combined list of attributes.

Example 12. A computing device according to any of the previous examples, wherein the selected template is one that defines a low, medium, or high level of scrambling methods.

Example 13. A computing device according to any of the previous examples, the operations further comprising:
receiving a change to one or more scrambling method determined based on the selected template; and
updating one or more attributes associated with the one or more scrambling method based on the received change to the one or more scrambling method.

Example 14. A computing device according to any of the previous examples, wherein the production data is a reduced set of total production data, and the reduced set is generating by performing operations comprising:
receiving selected parameters to reduce the total production data;
determining candidate data to remove from the production data based on the selected parameters;
determining open items in the candidate data; and
reducing the total production data by removing candidate data except for open items in the candidate data, to generate the reduced set of total production data.

Example 15. A computing device according to any of the previous examples, wherein the selected parameters include at least one of a date and an organizational unit.

Example 16. A computing device according to any of the previous examples, wherein determining candidate data to remove from the production data is further based on table size, wherein only tables over a predetermine size are considered for candidate data.

Example 17. A computing device according to any of the previous examples, wherein determining known attributes and determining a list of attributes for the custom tables comprises running predefined scripts associated with the at least one selected object to locate data associated with a type of data for the at least one object.

Example 18. A computing device according to any of the previous examples, wherein the system is a first system and further comprising:
generating a second list of attributes for a second selected object in a second system by combining known attributes and a list of attributes for custom tables in production data for the second system;
determining a scrambling method for each attribute in the list of attributes for the second selected object;
scrambling each attribute of the list of attributes for the second selected object, according to the scrambling method for each attribute and a mapping of attributes between the first system and the second system, to generate scrambles attributes; and
allowing release of production data comprising the scrambled attributes for the second selected object, to a test system for use in testing functionality for the application or service.

Example 19. A non-transitory computer-readable medium comprising instructions stored thereon that are executable by at least one processor to cause a computing device to perform operations comprising:
determining known attributes of tables associated with at least one selected object associated with a type of personal or confidential data in production data;
determining custom tables associated with the at least one selected object;
determining a list of attributes for the custom tables based on data types for each custom table and a text analysis of data in each custom table;
generating a combined list of attributes for the at least one selected object by combining the known attributes and the list of attributes for the custom tables;
determining a scrambling method for each attribute in the combined list of attributes for the at least one selected object;
scrambling each attribute of the combined list of attributes for the at least one selected object, according to the scrambling method for each attribute, to generate scrambled attributes;
generating a compliance report indicating what was changed in a system by the scrambling of each attribute and what scrambling methods were applied; and
allowing release of production data comprising the scrambled attributes for the at least one selected object, to a test system for use in testing functionality for an application or service.

Example 11. A non-transitory computer-readable medium according to any of the previous examples, wherein determining known attributes and determining a list of attributes for the custom tables comprises running predefined scripts associated with the at least one selected object to locate data associated with a type of data for the at least one object.

Figure 10:
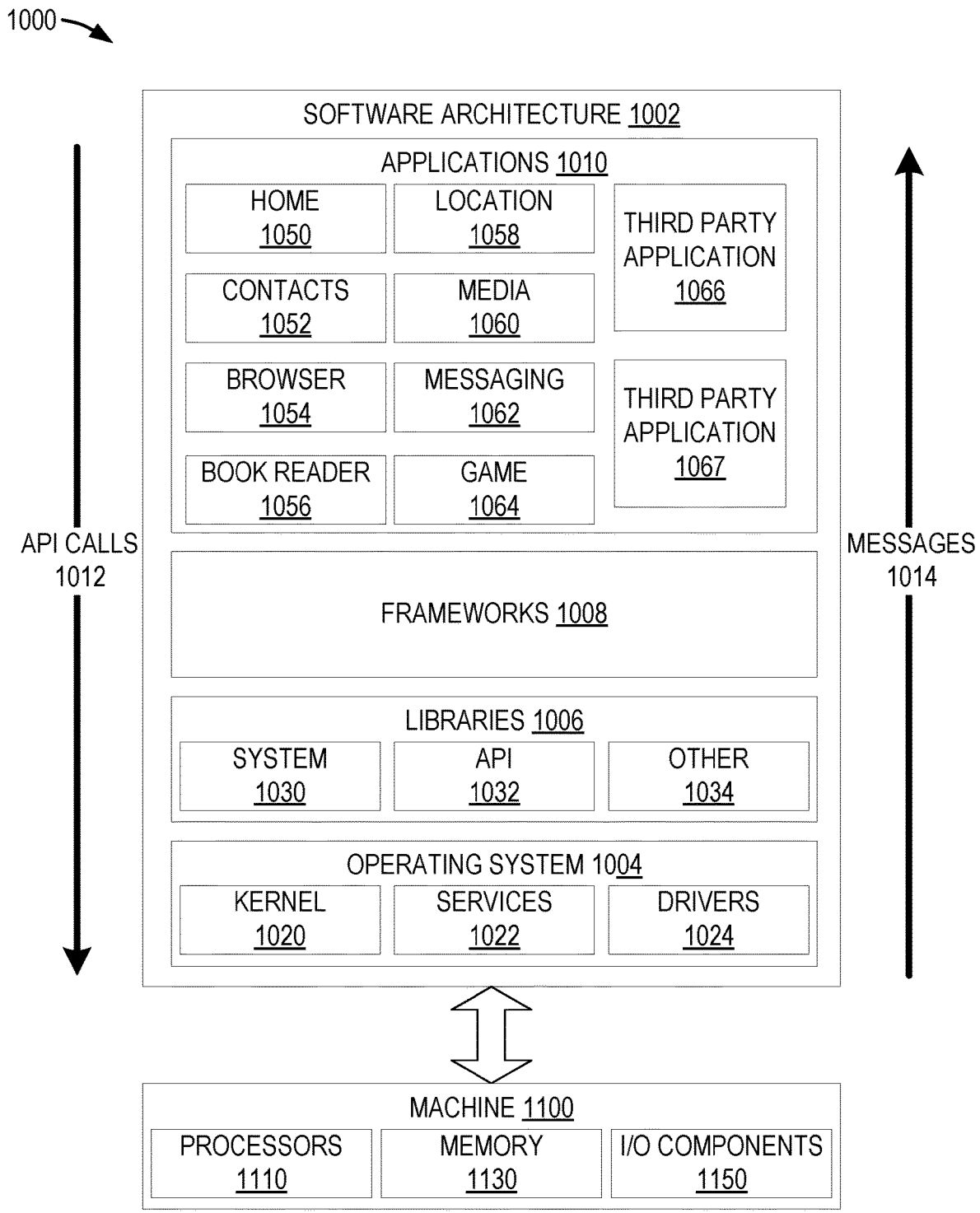
FIG. 10 is a block diagram illustrating an example of a software architecture that may be installed on a machine, according to some example embodiments.

FIG. 10 is a block diagram 1000 illustrating software architecture 1002, which can be installed on any one or more of the devices described above. For example, in various embodiments, client devices 110 and servers and systems 130, 102, 120, 122, and 124 may be implemented using some or all of the elements of software architecture 1002. FIG. 10 is merely a non-limiting example of a software architecture, and it will be appreciated that many other architectures can be implemented to facilitate the functionality described herein. In various embodiments, the software architecture 1002 is implemented by hardware such as machine 1100 of FIG. 11 that includes processors 1110, memory 1130, and input/output (I/O) components 1150. In this example, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphical user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as third-party applications 1066 and 1067. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
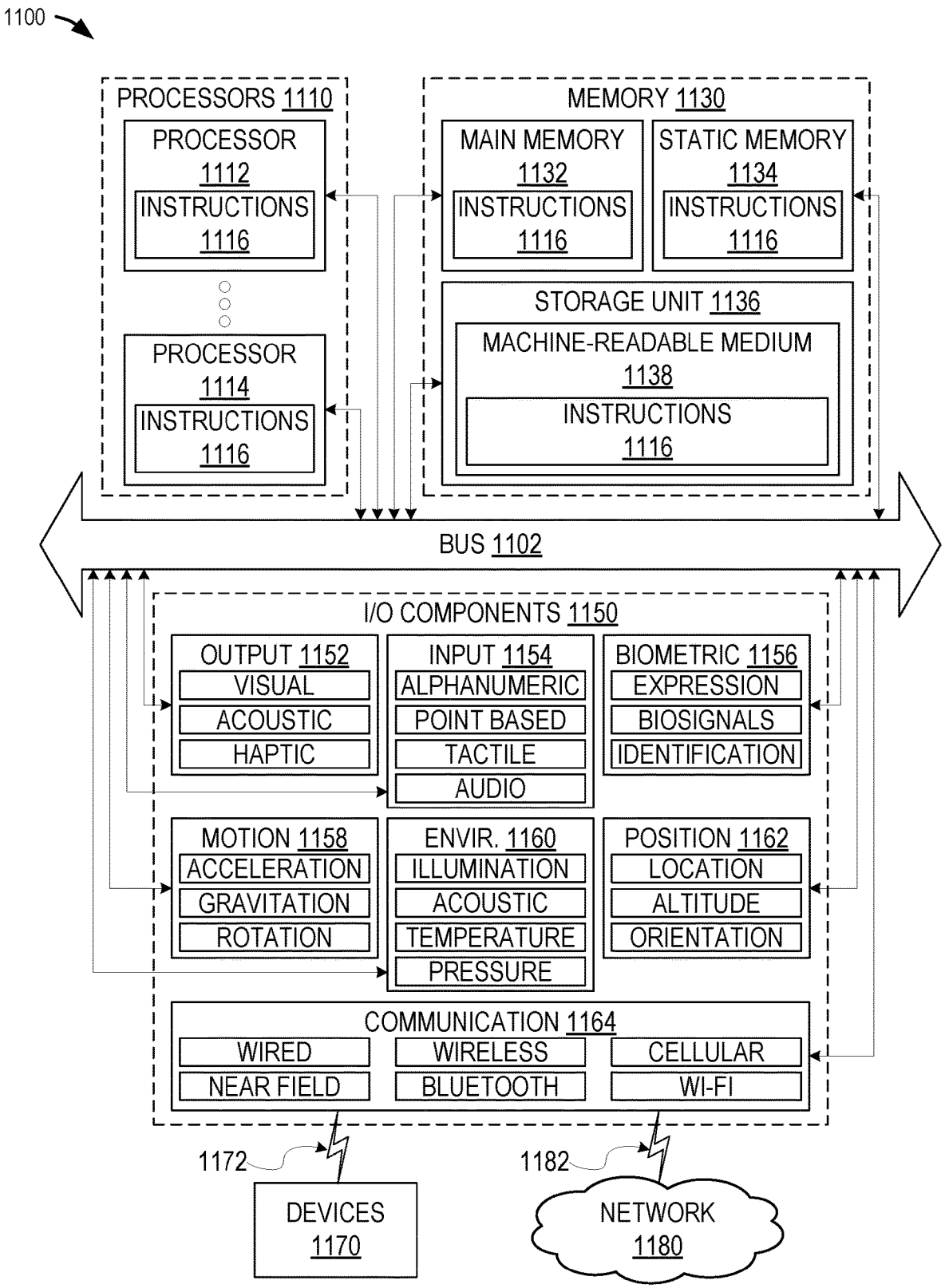
FIG. 11 illustrates a diagrammatic representation of a machine, in the form of a computer system, within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein can be executed. In alternative embodiments, the machine 1100 operates as a stand-alone device or can be coupled (e.g., networked) to other machines. In a networked deployment, the machine 1100 may operate in the capacity of a server machine or system 130, 102, 120, 122, 124, etc., or a client device 110 in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1110, the machine 1100 may include a single processor 1110 with a single core, a single processor 1110 with multiple cores (e.g., a multi-core processor 1110), multiple processors 1112, 1114 with a single core, multiple processors 1112, 1114 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the machine-readable medium 1138 should be considered as being transportable from one physical location to another. Additionally, since the machine-readable medium 1138 is tangible, the machine-readable medium 1138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   determining, by a computing system, known attributes of tables associated with at least one selected object associated with a type of personal or confidential data in production data;
   determining, by the computing system, custom tables associated with the at least one selected object;
   determining, by the computing system, a list of attributes for the custom tables based on data types for each custom table and a text analysis of data in each custom table;
   generating, by the computing system, a combined list of attributes for the at least one selected object by combining the known attributes and the list of attributes for the custom tables;
   determining, by the computing system, a scrambling method for each attribute in the combined list of attributes for the at least one selected object;
   receiving a change to one or more scrambling method determined for each attribute in the combined list of attributes for the at least one selected object;
   updating one or more attributes associated with the one or more scrambling method based on the received change to the one or more scrambling method;
   scrambling, by the computing system, each attribute of the combined list of attributes for the at least one selected object, according to the scrambling method for each attribute, to generate scrambled attributes;
   generating, by the computing system, a compliance report indicating what was changed in a system by the scrambling of each attribute and what scrambling methods were applied; and
   allowing release of production data comprising the scrambled attributes for the at least one selected object, to a test system for use in testing functionality for an application or service, level of scrambling methods.

2. The method of claim 1, wherein determining a scrambling method for each attribute in the combined list of attributes for the at least one selected object is based on a selected template that sets a scrambling method of each attribute in the combined list of attributes.

3. The method of claim 2, wherein the selected template is one that defines a low, medium, or high level of scrambling methods.

4. The method of claim 1, wherein the production data is a reduced set of total production data, and the reduced set is generating by performing operations comprising:
   receiving selected parameters to reduce the total production data;
   determining candidate data to remove from the production data based on the selected parameters;
   determining open items in the candidate data; and
   reducing the total production data by removing candidate data except for open items in the candidate data, to generate the reduced set of total production data.

5. The method of claim 4, wherein the selected parameters include at least one of a date and an organizational unit.

6. The method of claim 4, wherein determining candidate data to remove from the production data is further based on table size, wherein only tables over a predetermine size are considered for candidate data.

7. The method of claim 1, wherein determining known attributes and determining a list of attributes for the custom tables comprises running predefined scripts associated with the at least one selected object to locate data associated with a type of data for the at least one object.

8. The method of claim 1, wherein the system is a first system and further comprising:
   generating a second list of attributes for a second selected object in a second system by combining known attributes and a list of attributes for custom tables in production data for the second system;
   determining a scrambling method for each attribute in the list of attributes for the second selected object;
   scrambling each attribute of the list of attributes for the second selected object, according to the scrambling method for each attribute and a mapping of attributes between the first system and the second system, to generate scrambles attributes; and
   allowing release of production data comprising the scrambled attributes for the second selected object, to a test system for use in testing functionality for the application or service.

9. A computing device comprising:
   a memory that stores instructions; and
   one or more processors configured by the instructions to perform operations comprising: determining known attributes of tables associated with at least one selected object associated with a type of personal or confidential data in production data;
   determining custom tables associated with the at least one selected object;
   determining a list of attributes for the custom tables based on data types for each custom table and a text analysis of data in each custom table;
   generating a combined list of attributes for the at least one selected object by combining the known attributes and the list of attributes for the custom tables;
   determining a scrambling method for each attribute in the combined list of attributes for the at least one selected object;
   receiving a change to one or more scrambling method determined for each attribute in the combined list of attributes for the at least one selected object;
   updating one or more attributes associated with the one or more scrambling method based on the received change to the one or more scrambling method;
   scrambling each attribute of the combined list of attributes for the at least one selected object, according to the scrambling method for each attribute, to generate scrambled attributes;
   generating a compliance report indicating what was changed in a system by the scrambling of each attribute and what scrambling methods were applied; and
   allowing release of production data comprising the scrambled attributes for the at least one selected object, to a test system for use in testing functionality for an application or service.

10. The computing device of claim 9, wherein determining a scrambling method for each attribute in the combined list of attributes for the at least one selected object is based on a selected template that sets a scrambling method of each attribute in the combined list of attributes.

11. The computing device of claim 10, wherein the selected template is one that defines a low, medium, or high level of scrambling methods.

12. The computing device of claim 9, wherein the production data is a reduced set of total production data, and the reduced set is generating by performing operations comprising:
   receiving selected parameters to reduce the total production data;

determining candidate data to remove from the production data based on the selected parameters;

determining open items in the candidate data; and reducing the total production data by removing candidate data except for open items in the candidate data, to generate the reduced set of total production data.

13. The computing device of claim 12, wherein the selected parameters include at least one of a date and an organizational unit.

14. The computing device of claim 12, wherein determining candidate data to remove from the production data is further based on table size, wherein only tables over a predetermine size are considered for candidate data.

15. The computing device of claim 9, wherein determining known attributes and determining a list of attributes for the custom tables comprises running predefined scripts associated with the at least one selected object to locate data associated with a type of data for the at least one object.

16. The computing device of claim 9, wherein the system is a first system and further comprising:

generating a second list of attributes for a second selected object in a second system by combining known attributes and a list of attributes for custom tables in production data for the second system;

determining a scrambling method for each attribute in the list of attributes for the second selected object;

scrambling each attribute of the list of attributes for the second selected object, according to the scrambling method for each attribute and a mapping of attributes between the first system and the second system, to generate scrambles attributes; and allowing release of production data comprising the scrambled attributes for the second selected object, to a test system for use in testing functionality for the application or service.

17. A non-transitory computer-readable medium comprising instructions stored thereon that are executable by at least one processor to cause a computing device to perform operations comprising:

determining known attributes of tables associated with at least one selected object associated with a type of personal or confidential data in production data;

determining custom tables associated with the at least one selected object;

determining a list of attributes for the custom tables based on data types for each custom table and a text analysis of data in each custom table;

generating a combined list of attributes for the at least one selected object by combining the known attributes and the list of attributes for the custom tables;

determining a scrambling method for each attribute in the combined list of attributes for the at least one selected object;

receiving a change to one or more scrambling method determined for each attribute in the combined list of attributes for the at least one selected object;

updating one or more attributes associated with the one or more scrambling method based on the received change to the one or more scrambling method;

scrambling each attribute of the combined list of attributes for the at least one selected object, according to the scrambling method for each attribute, to generate scrambled attributes;

generating a compliance report indicating what was changed in a system by the scrambling of each attribute and what scrambling methods were applied; and allowing release of production data comprising the scrambled attributes for the at least one selected object, to a test system for use in testing functionality for an application or service.

18. The non-transitory computer-readable medium of claim 17, wherein determining known attributes and determining a list of attributes for the custom tables comprises running predefined scripts associated with the at least one selected object to locate data associated with a type of data for the at least one object.

* * * * *